(12) United States Patent
Emizu et al.

(10) Patent No.: US 9,470,295 B2
(45) Date of Patent: Oct. 18, 2016

(54) HYDRAULIC TENSIONER DEVICE

(71) Applicant: HONDA MOTOR CO., LTD., Tokyo (JP)

(72) Inventors: Osamu Emizu, Wako (JP); Takayuki Osako, Wako (JP); Koji Terada, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 70 days.

(21) Appl. No.: 14/621,629

(22) Filed: Feb. 13, 2015

(65) Prior Publication Data

US 2015/0240918 A1 Aug. 27, 2015

(30) Foreign Application Priority Data

Feb. 21, 2014 (JP) ................................. 2014-031477
Jun. 11, 2014 (JP) ................................. 2014-120400

(51) Int. Cl.
*F16H 7/22* (2006.01)
*F16H 7/08* (2006.01)
*F01L 1/02* (2006.01)

(52) U.S. Cl.
CPC .................. *F16H 7/08* (2013.01); *F01L 1/024* (2013.01); *F16H 2007/0806* (2013.01); *F16H 2007/0814* (2013.01); *F16H 2007/0817* (2013.01); *F16H 2007/0859* (2013.01); *F16H 2007/0893* (2013.01)

(58) Field of Classification Search
CPC .............. F16H 2007/0806; F16H 2007/0859; F16H 2007/0812; F16H 7/0836; F16H 7/0848
USPC ......................................................... 474/110
See application file for complete search history.

(56) References Cited

U.S. PATENT DOCUMENTS

| | | | | |
|---|---|---|---|---|
| 4,504,251 A * | 3/1985 | Mittermeier | .......... | F16H 7/0836 474/110 |
| 4,507,103 A * | 3/1985 | Mittermeier | .......... | F16H 7/0836 474/110 |
| 5,314,388 A * | 5/1994 | Suzuki | ....................... | F16H 7/08 474/110 |
| 6,196,939 B1 * | 3/2001 | Simpson | ............... | F16H 7/0848 474/101 |
| 6,383,103 B1 * | 5/2002 | Fujimoto | .................. | F01L 1/02 474/109 |
| 6,398,682 B1 * | 6/2002 | Suzuki | ....................... | F16H 7/08 474/110 |
| 7,070,528 B2 * | 7/2006 | Emizu | .................... | F16H 7/0836 474/109 |
| 7,608,004 B2 * | 10/2009 | Yoshida | ................ | F16H 7/0836 474/110 |
| 7,699,730 B2 * | 4/2010 | Emizu | .................... | F16H 7/0836 474/110 |
| 8,002,656 B2 * | 8/2011 | Emizu | .................... | F16H 7/0836 474/109 |
| 8,137,224 B2 * | 3/2012 | Emizu | .................... | F16H 7/0836 474/110 |
| 8,951,154 B2 * | 2/2015 | Konuma | ............... | F16H 7/0848 474/110 |
| 2003/0216202 A1 * | 11/2003 | Emizu | .................... | F16H 7/0836 474/109 |

(Continued)

FOREIGN PATENT DOCUMENTS

JP 2012-211643 11/2012

*Primary Examiner* — Henry Liu
(74) *Attorney, Agent, or Firm* — Rankin, Hill & Clark LLP

(57) ABSTRACT

In a hydraulic tensioner device in which a high hydraulic pressure chamber is configured between a plunger accommodation hole of a tensioner body accommodating a plunger and the plunger to attenuate reactive force acting on the plunger, the tensioner body includes, in a discharge oil passage for discharging oil leaked from the high hydraulic pressure chamber, a pressure maintenance valve for opening and closing the discharge oil passage, air release passages are formed inside the pressure maintenance valve, and an air release valve for releasing air and preventing air from back flowing is provided in the air release passages.

20 Claims, 12 Drawing Sheets

(56) References Cited

U.S. PATENT DOCUMENTS

| | | | | |
|---|---|---|---|---|
| 2006/0063625 A1* | 3/2006 | Emizu | F16H 7/0836 474/110 |
| 2006/0084537 A1* | 4/2006 | Matsushita | F16H 7/0836 474/109 |
| 2006/0094549 A1* | 5/2006 | Yoshida | F16H 7/0836 474/110 |
| 2007/0032322 A1* | 2/2007 | Beardmore | F16H 7/0848 474/110 |
| 2007/0249444 A1* | 10/2007 | Yoshida | F16H 7/0836 474/110 |
| 2008/0090685 A1* | 4/2008 | Namie | F16H 7/0836 474/110 |
| 2008/0280712 A1* | 11/2008 | Ryouno | F16H 7/0836 474/110 |
| 2009/0197721 A1* | 8/2009 | Emizu | F16H 7/0836 474/110 |
| 2009/0197722 A1* | 8/2009 | Emizu | F16H 7/0836 474/110 |
| 2011/0251000 A1* | 10/2011 | Kroon | F16H 7/0848 474/110 |
| 2011/0263366 A1* | 10/2011 | Botez | F16H 7/0848 474/110 |
| 2012/0252615 A1* | 10/2012 | Konuma | F16H 7/0848 474/110 |
| 2012/0252616 A1* | 10/2012 | Tawarada | F16H 7/0848 474/110 |
| 2013/0260930 A1* | 10/2013 | Kurematsu | F16H 7/08 474/110 |
| 2014/0378253 A1* | 12/2014 | Tanaka | F16H 7/1236 474/110 |

* cited by examiner

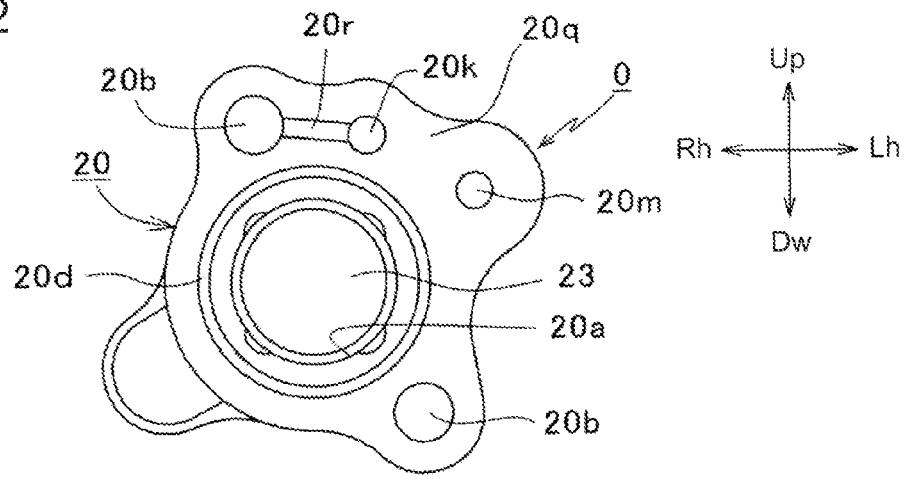
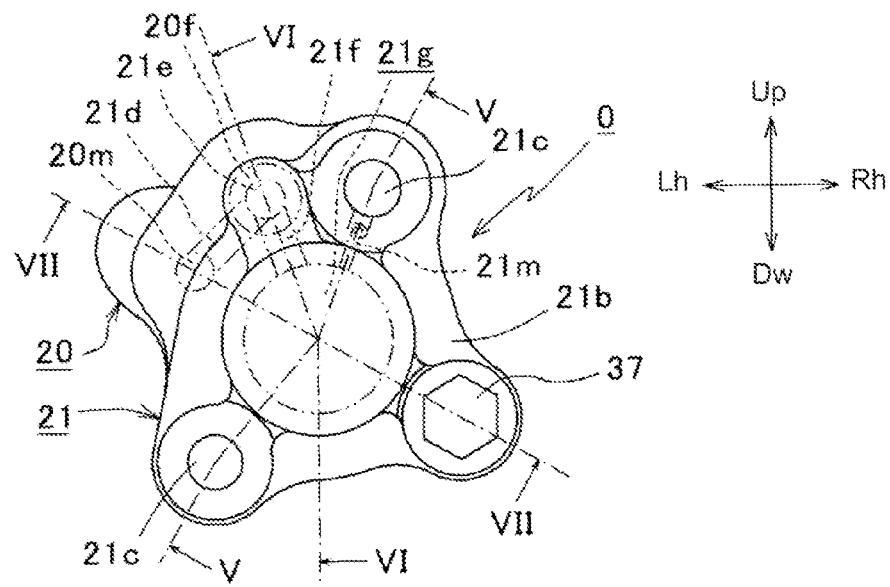
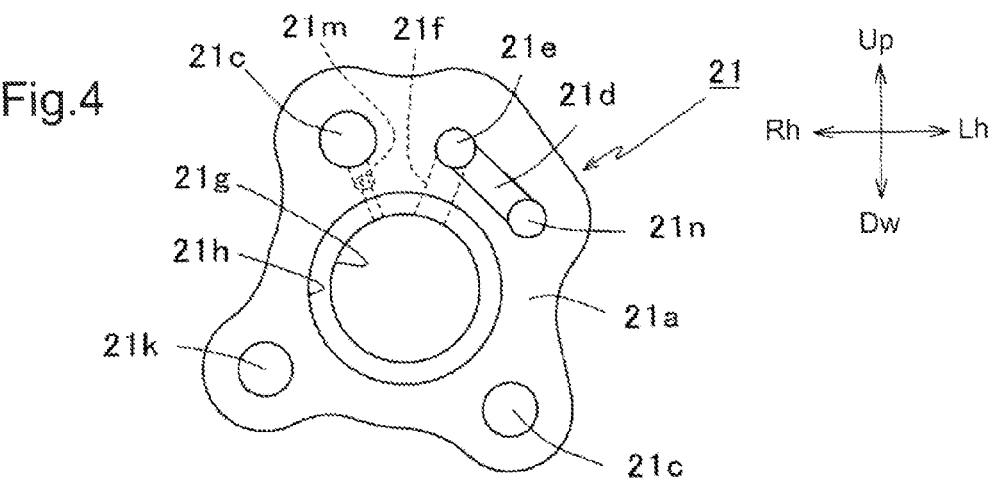

HYDRAULIC TENSIONER DEVICE

BACKGROUND OF THE INVENTION

1. Field of the Invention

The present invention relates to a hydraulic tensioner device for applying appropriate tension to an endless transmission member, such as an endless chain or an endless belt, which transmits driving force of a valve train of an internal combustion engine.

2. Description of Related Art

A hydraulic tensioner device for tightening looseness in an endless transmission belt that transmits power to a rotary shaft of a valve train from a rotary shaft of an internal combustion engine includes as separate parts: a pressure maintenance valve for maintaining, at a constant level, hydraulic pressure generated inside a hydraulic chamber of a tensioner body, which is pushed in by counteraction to application of tension on the endless transmission belt; and an air release valve for releasing air generated inside the hydraulic chamber (see Japanese Patent Application Publication No. 2012-211643).

In the hydraulic tensioner device described in Japanese Patent Application Publication No. 2012-211643, appropriate tension can be applied to the endless transmission belt since the pressure maintenance valve maintains hydraulic pressure inside the hydraulic chamber of the tensioner body at a constant level, and excessive tension is not applied to the endless transmission belt since the air release valve allows air contained in the oil inside the hydraulic chamber of the tensioner body to be separated from the oil and released into the atmosphere.

However, providing a pressure maintenance valve and an air release valve as separate parts in a hydraulic tensioner device not only complicates the structure and increase the number of parts, but also enlarges the hydraulic tensioner device in size and inevitably increase manufacturing cost.

SUMMARY OF THE INVENTION

The present invention is related to improvement in a hydraulic tensioner device capable of solving these problems, and aims to provide a small, light, and inexpensive hydraulic tensioner device that can keep an endless transmission belt in an appropriately tensioned state regardless of the operating condition.

In accordance with the present invention, a hydraulic tensioner device used in a driving force-transmission mechanism for internal combustion engine provided with an endless transmission belt that transmits power while being wound around a driving member and a driven member, includes: a plunger biased toward the endless transmission belt side to tighten looseness of the endless transmission belt; and a tensioner body in which a plunger accommodation hole for slidably accommodating the plunger is formed, a high hydraulic pressure chamber being configured by reserving oil fed through a check valve between the plunger and the plunger accommodation hole to attenuate reactive force acting on the plunger. The tensioner body includes, in a discharge oil passage for discharging oil leaked from the high hydraulic pressure chamber, a pressure maintenance valve for opening and closing the discharge oil passage; an air release passage is formed inside the pressure maintenance valve; and an air release valve for releasing air and preventing air from back flowing is provided in the air release passage.

Since air in hydraulic oil inside the high hydraulic pressure chamber, which is configured between the plunger accommodation hole of the tensioner body and the plunger slidably accommodated in the plunger accommodation hole, is released through the air release passage integrated with the pressure maintenance valve, not only can parts related to the pressure maintenance valve be eliminated, but also the hydraulic pathway can be simplified, whereby reduction in weight of the hydraulic tensioner device and a significant cost reduction can be achieved.

In further accordance with the present invention, the pressure maintenance valve is configured of a piston valve body; the piston valve body is slidably accommodated in a pressure maintenance valve-accommodation hole formed in the tensioner body; the air release passage is configured of a radial passage opened in a side face of the piston valve body and extending radially, and an axial passage extending opposite to a pressure receiving face of the piston valve body onto which pressurized oil is fed from the radial passage; and the air release valve is provided inside the axial passage along a direction in which the pressure maintenance valve operates.

Since the air release passage formed in the pressure maintenance valve is configured of the axial passage and the radial passage opened in the side face of the piston valve body of the pressure maintenance valve, and the air release valve is provided so as to be movable in the axial passage along the direction in which the valve operates, the outer diameter of the piston valve body of the pressure maintenance valve is smaller than a case where the valve operates in the radial direction, and thus the hydraulic tensioner device can be reduced in size.

In further accordance with the present invention, the air release valve includes a ball valve body, ball valve biasing device biasing the ball valve body, and a retainer in which the ball valve biasing device is retained; and at least a part of the retainer and the ball valve biasing device are included within an area where they are overlapped with piston valve body-biasing means in the axial direction.

By arranging at least a part of the air release valve spring and the retainer inside the piston valve body spring within an area where they are overlapped with the piston valve body spring in the axial direction, and incorporating the air release valve into the pressure maintenance valve, the length of the pressure maintenance valve in the axial direction can be suppressed, and the hydraulic tensioner device can be even more reduced in size.

In further accordance with the present invention, an enlarged diameter portion having an enlarged outer diameter on the side on which it abuts the piston valve body is formed in the retainer; the ball valve body is accommodated inside the enlarged diameter portion; and an end portion of the piston valve body-biasing device is held by an outer circumferential surface of the enlarged diameter portion and an inner circumferential surface of the piston valve body.

By forming the enlarged diameter portion by enlarging the diameter of the retainer on the piston valve body side, and using the outer circumferential surface thereof and the inner circumferential surface of the piston valve body to hold the piston valve body-biasing device, radial movement of the piston valve body-biasing device can be restricted, and opening and closing accuracy of the pressure maintenance valve can be improved.

In further accordance with the present invention, the radial passage is provided in a position where it is closed by the pressure maintenance valve-accommodation hole when the pressure maintenance valve is closed.

Since the air release passage is closed when the radial passage of the pressure maintenance valve is disconnected from the connection port of the tensioner body by a rearward movement of the piston valve body of the pressure maintenance valve, leakage of hydraulic oil from the air release valve is suppressed, and hydraulic oil can be retained more securely.

In further accordance with the present invention, when the pressure maintenance valve is installed in an internal combustion engine of the hydraulic tensioner device, it is arranged higher than the plunger. By installing the pressure maintenance valve in a higher position than the plunger in the tensioner body, leakage air accumulated inside the high hydraulic pressure chamber can be collected and be released more efficiently.

In further accordance with the present invention, an oil feed passage is formed lower than the pressure maintenance valve in the tensioner body; and the oil feed passage is connected to the pressure maintenance valve positioned higher than the oil feed passage by a horizontal passage provided in a cap of the hydraulic tensioner device. By connecting the oil feed passage provided in the tensioner body to the higher-positioned pressure maintenance valve through the horizontal passage of the cap, air mixed in fed oil is more easily accumulated in the extended feed passage, so that air flow into the high hydraulic pressure chamber can be inhibited.

In further accordance with the present invention, an oil reservoir is provided between the oil feed passage and the high hydraulic pressure chamber; an extended feed passage is formed above the oil reservoir, in the axial direction of the pressure maintenance valve; and the oil feed passage is connected to the oil reservoir through the extended feed passage.

Since the extended feed passage is formed in an intermediate part of the oil feed pathway to the oil reservoir in such a manner as to extend in the axial direction above the oil reservoir, air mixed in fed oil can be retained inside the extended feed passage, and be inhibited from entering the oil reservoir.

BRIEF DESCRIPTION OF THE DRAWINGS

These and further features of the invention will be apparent with reference to the following description and drawings, wherein:

FIG. 2 shows the hydraulic tensioner of the present invention from the front.

FIG. 3 is a view on arrow III of the hydraulic tensioner in FIG. 1.

FIG. 4 shows a front end face of a cap of the hydraulic tensioner from the front.

DETAILED DESCRIPTION OF THE INVENTION

Hereinafter, a description is given of a hydraulic tensioner 0 of an embodiment of the present invention shown in FIGS. 1 to 14.

Figure 1:
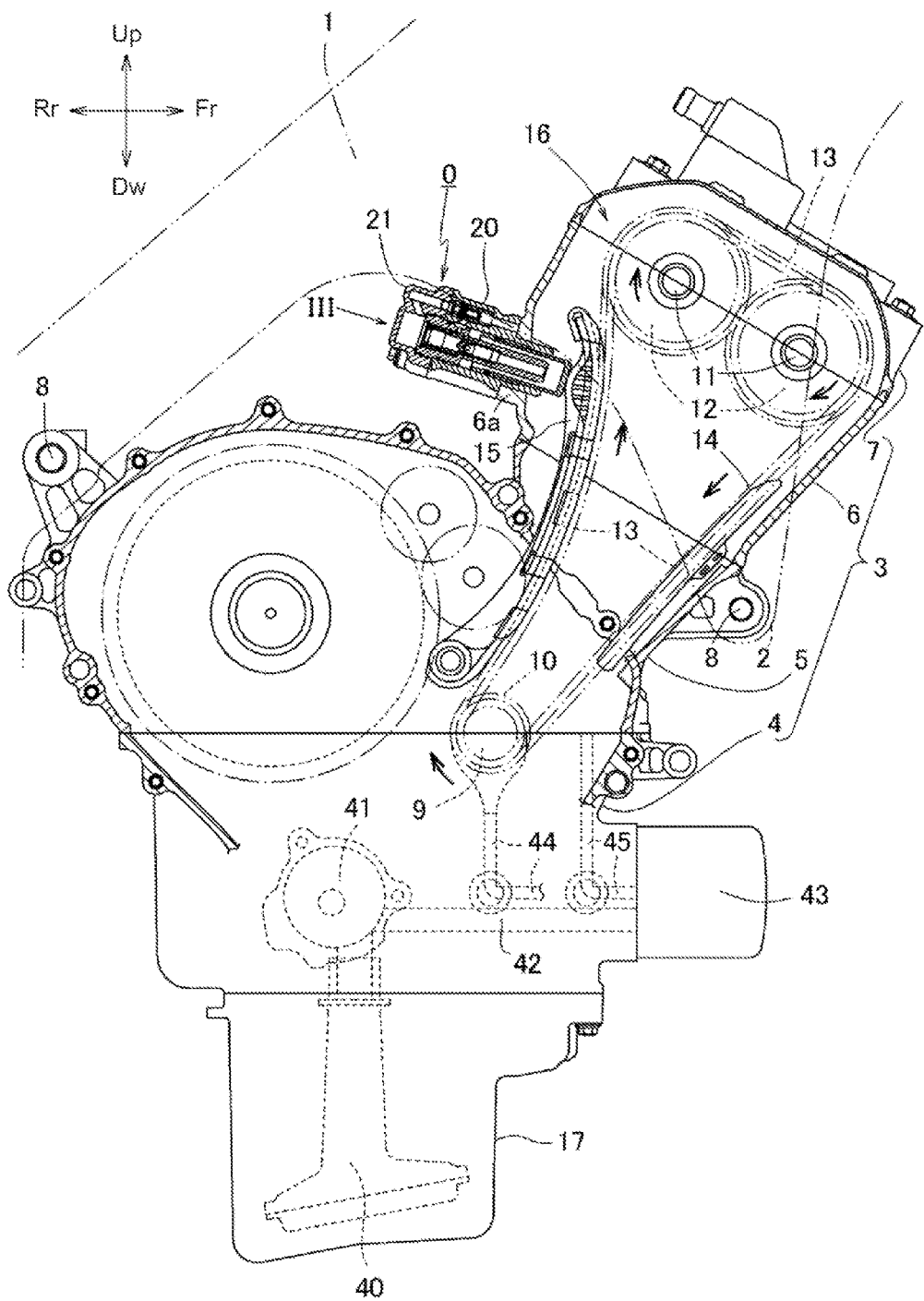
FIG. 1 shows a hydraulic tensioner of an embodiment of the present invention, and shows an example where the hydraulic tensioner is applied to a timing chain constituting a driving force-transmission mechanism of a valve gear, in a four-stroke cycle DOHC internal combustion engine mounted on a motorcycle.

FIG. 1 is a right side view of a main part of an internal combustion engine 3, which includes the hydraulic tensioner 0, attached to a body frame 1 of a motorcycle (or a street-running vehicle such as an automobile).

In the embodiment, directions such as front and rear, upper and lower, and left and right refer to the front and rear, upper and lower directions, and left and right of the vehicle body. In FIG. 1, the front and rear directions indicate the right and left directions of the sheet, the upper and lower directions indicate the upper and lower directions of the sheet, and the left and right directions indicate directions far and near with respect to the sheet.

As shown in FIG. 1, the four-stroke cycle DOHC internal combustion engine 3 including the hydraulic tensioner 0 is mounted on a motorcycle, and specifically, is configured so as to be attached to a hanger 2 provided in a front portion of the body frame 1 of the motorcycle and a rear portion of the body frame 1, through two bosses 8 each protruding from the internal combustion engine 3.

In the internal combustion engine 3, a cylinder block 5, a cylinder head 6, and a head cover 7 are sequentially stacked on top of one another on a crankcase 4, and are integrally coupled with coupling means such as bolts (not shown).

The internal combustion engine 3 includes a driving force-transmission mechanism 16 for transmitting rotary driving force of a crankshaft 9 to camshafts 11 provided with cams (not shown) opening and closing an unillustrated piston. In the driving force-transmission mechanism 16, an endless timing chain 13 as an endless transmission belt is wound across a drive sprocket 10 as a driving member, which is integrated with the crankshaft 9 pivotally supported in a rotatable manner between the crankcase 4 and the cylinder block 5 of the internal combustion engine 3, and driven sprockets 12 as driven members, which are integrated with paired camshafts 11 pivotally supported in a rotatable manner by the cylinder head 6 inside the cylinder head 6 and the head cover 7. A vertical motion of the unillustrated piston fitted into a cylinder hole (not shown) of the cylinder block 5 in a vertically slidable manner transmits rotational torque of the crankshaft 9, which is rotationally driven in the clockwise direction in FIG. 1, to the paired camshafts 11 through the drive sprocket 10, the endless timing chain 13, and the driven sprocket 12, whereby unillustrated intake and exhaust valves are driven to open and close.

The four-stroke cycle internal combustion engine 3 has multiple unillustrated cylinder holes arranged in the vehicle width direction. In the internal combustion engine 3, the endless timing chain 13 tends to flap in the front-rear direction because in each cylinder hole, fuel inside the combustion chamber is combusted in every two rotations of the crankshaft 9, so that pressure of the combustion gas pushes the piston toward the crankshaft 9 intermittently, and additionally, variation in running resistance caused by unevenness in the pavement on which the motorcycle travels varies the tension of the endless timing chain 13.

To prevent this, a chain guide 14 is provided adjacent to the endless timing chain 13 on the tensioned side at the front, which is on the right in FIG. 1, and a tensioner slipper 15 is provided adjacent to the loose side at the rear, which is on the left in FIG. 1. The hydraulic tensioner 0 is assembled to a lifter attachment portion 6a of the cylinder head 6 behind and adjacent to the tensioner slipper 15, and has a structure and characteristic to be described in detail later. The excellent characteristic of the hydraulic tensioner 0 makes it possible to effectively suppress flapping of the endless timing chain 13 on the loose side.

Figure 5:
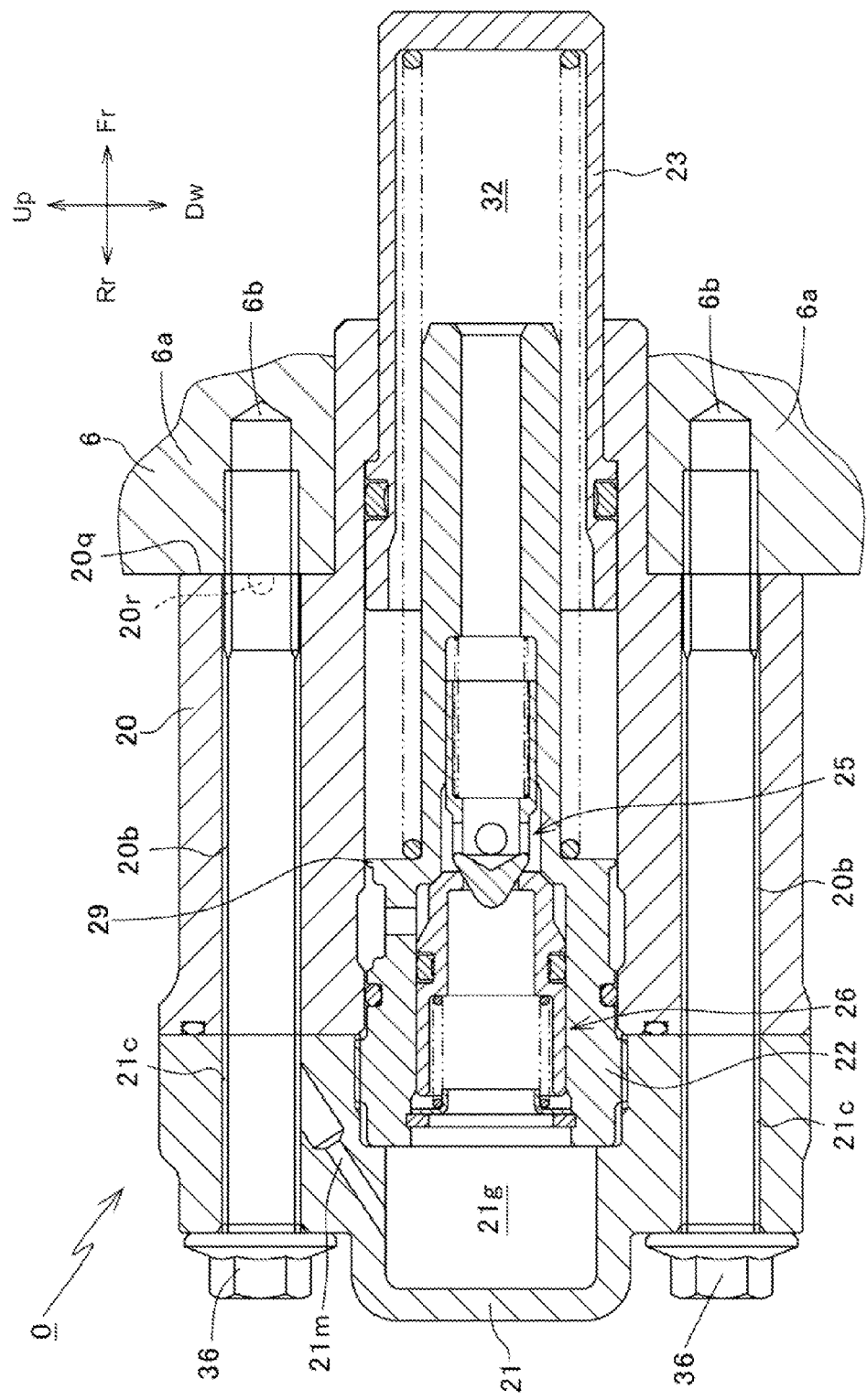
FIG. 5 is a sectional view taken along line V-V of the hydraulic tensioner in FIG. 3.

As shown in FIG. 5, an outer shell portion of the hydraulic tensioner 0 in FIG. 1 consists of a tensioner body 20 and a cap 21 attached to a rear end portion of the tensioner body 20. The hydraulic tensioner 0 is integrally attached to the lifter attachment portion 6a in a rear portion of the cylinder head 6, in such a manner that tensioner fixing bolts 36 are inserted through paired left and right tensioner fixing bolt insertion holes 21c provided in the cap 21 in FIG. 3, which is a view on arrow III of FIG. 1, penetrate tensioner fixing bolt insertion holes 20b in the tensioner body 20 in FIG. 2, and are screwed into female screw holes 6b provided in the lifter attachment portion 6a.

Figure 6:
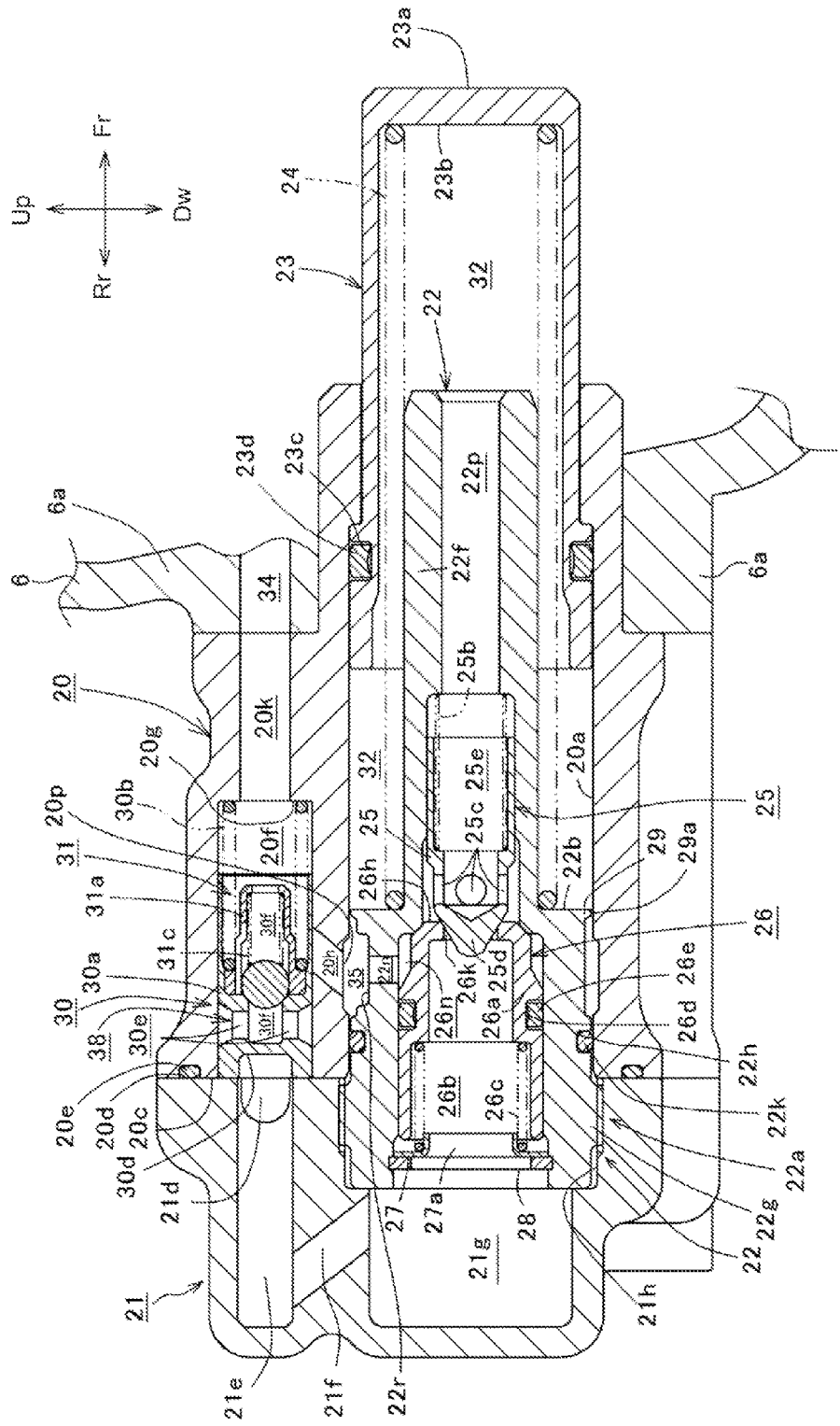
FIG. 6 is a sectional view taken along line VI-VI of the hydraulic tensioner in FIG. 3.
Figure 8:
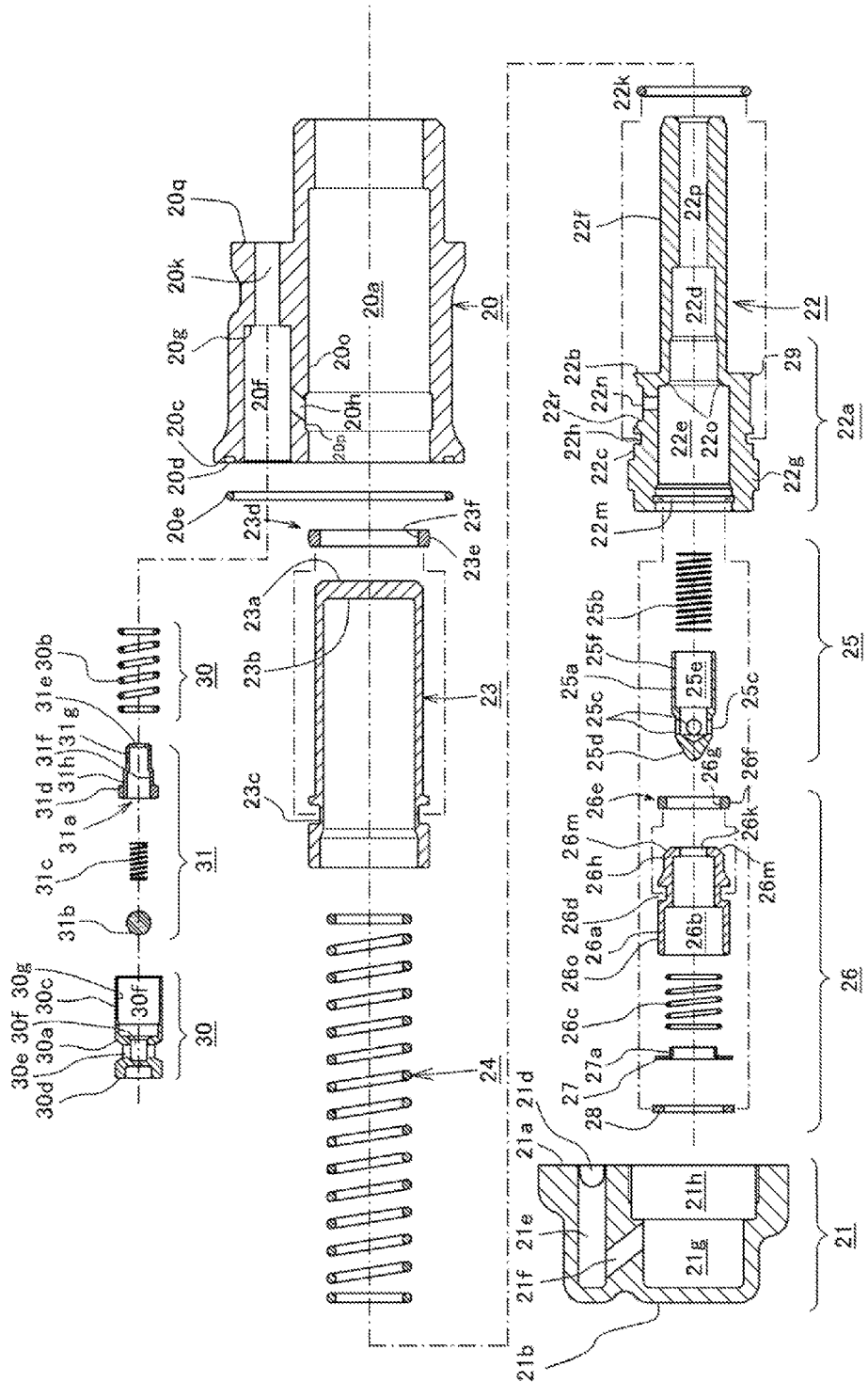
FIG. 8 is an exploded sectional view in which component members of the hydraulic tensioner are disassembled to show how the component members are attached to one another.

As shown in FIGS. 6 and 8, a plunger accommodation hole 20a is formed in the tensioner body 20, and a pressure maintenance valve-accommodation hole 20f is formed above the plunger accommodation hole 20a. Additionally, a discharge hole 20k connecting with a discharge passage 34 provided in the lifter attachment portion 6a of the cylinder head 6 is formed in front of the pressure maintenance valve-accommodation hole 20f, and a connection port 20h is formed between the pressure maintenance valve-accommodation hole 20f and the plunger accommodation hole 20a to link both of the accommodation holes 20a, 20f. An inner groove 20p is formed in a position on an inner circumferential surface 20o of the plunger accommodation hole 20a where the connection port 20h is opened. The inner groove 20p and a circumferential concave portion 22r formed in the outer circumferential surface of a proximal end portion 22a of a later-mentioned valve holder 22 together constitute a connection passage 35 along the circumferential direction.

Moreover, as shown in FIGS. 2 and 5, an air exhaust passage 20r is formed in an abutting face 20q where the tensioner body 20 abuts on the cylinder head 6, so as to link the tensioner fixing bolt insertion hole 20b and the discharge hole 20k.

Further, as shown in FIGS. 6 and 8, an O ring fitting groove 20d is formed in a rear end face 20c of the tensioner body 20 so as to surround the plunger accommodation hole 20a, and an O ring 20e is fitted into the O ring fitting groove 20d.

Figure 7:
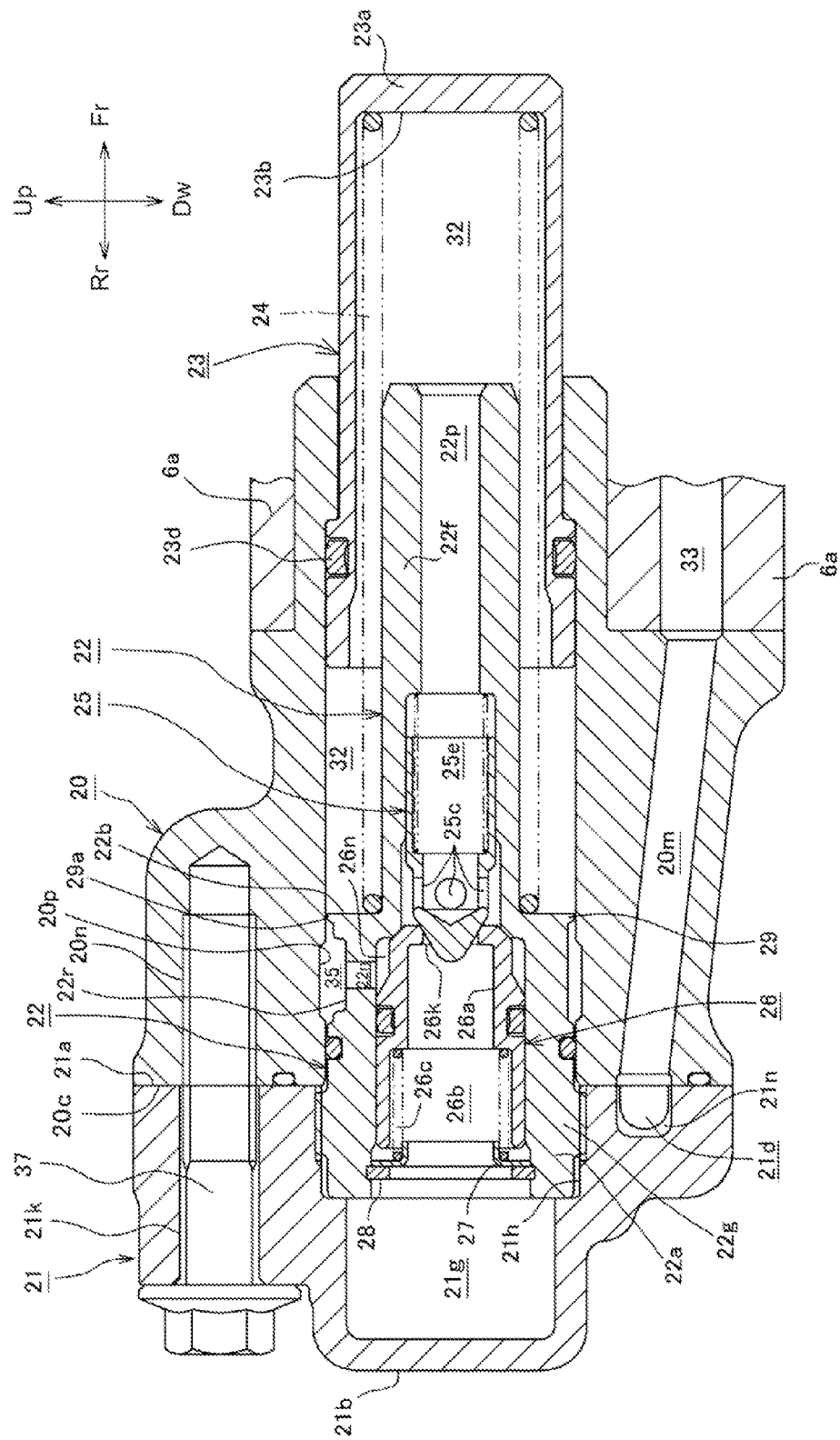
FIG. 7 is a sectional view taken along line VII-VII of the hydraulic tensioner in FIG. 3.

As shown in FIGS. 2, 3, and 7, an oil feed passage 20m is formed lower than a pressure maintenance valve 30 in the tensioner body 20, and is connected with a tensioner oil feed passage 33 provided in the lifter attachment portion 6a of the cylinder head 6. As shown in FIG. 1, oil pumped from an oil pump 41 operated by rotary driving force of the crankshaft 9 is fed to the hydraulic tensioner 0 through the tensioner oil feed passage 33.

As shown in FIGS. 6 to 8, a plunger 23 is formed into a cylindrical shape closed on its tip end portion 23a side, and has a circumferential groove 23c formed on its rear end side. A sealing ring 23d, which is a sealing member whose outer circumferential surface 23e has a convex rectangular cross section, is fitted to the circumferential groove 23c. Note that in the sealing ring 23d, in addition to the outer circumferential surface 23e, an inner circumferential surface 23f may also have a concave cross section that follows the shape of the outer circumferential surface 23e.

As shown in FIGS. 6 and 7, the plunger 23 is fitted into the plunger accommodation hole 20a of the tensioner body 20 so as to be slidable in the front-rear direction. In the plunger accommodation hole 20a, a high hydraulic pressure chamber 32 is configured of a valve holder 22 inserted into the plunger 23, and the plunger 23. Inside the high hydraulic pressure chamber 32, a plunger spring 24 as biasing means is interposed between a front end face 22b of a stepped portion of the proximal end portion 22a of the valve holder 22, and an inner face 23b of the tip end portion 23a of the plunger 23. Restoring force of the plunger spring 24 urges the plunger 23 to protrude frontward. When the hydraulic tensioner 0 is attached to the internal combustion engine 3, the tip end portion 23a of the plunger 23 abuts on a rear face of the tensioner slipper 15, as shown in FIG. 1. If, during operation of the internal combustion engine 3, the tensioner slipper 15 swings rearward by variation in the tension on the loose side of the endless timing chain 13 and pushes the tip end portion 23a of the plunger 23 rearward, the plunger 23 retracts and causes oil to leak from the high hydraulic pressure chamber 32 and be discharged from a later-mentioned discharge oil passage 38.

As shown in FIGS. 6 to 8, the valve holder 22 is configured of: a spring holding body 22f which is a cylindrical portion inserted into the plunger 23; and the proximal end portion 22a, which has multiple stepped portions, is formed in a rear portion of the spring holding body 22f, and faces the inner circumferential surface 20o of the plunger accommodation hole 20a when inserted into the plunger accommodation hole 20a of the tensioner body 20. In the proximal end portion 22a, an annular protrusion 29 and a cylindrical boss portion 22g are provided in different positions in the axial direction, and the circumferential concave portion 22r, which together with the inner groove 20p of the tensioner body 20 constitute the connection passage 35, is provided between the annular protrusion 29 and the cylindrical boss portion 22g. The connection passage 35 constitutes a part of the discharge oil passage 38 from the high hydraulic pressure chamber 32. A circumferential groove 22h is formed in an outer circumferential surface 22c of the cylindrical boss portion 22g, and an O ring 22k, which is a sealing member, is fitted into the circumferential groove 22h.

Figure 9:
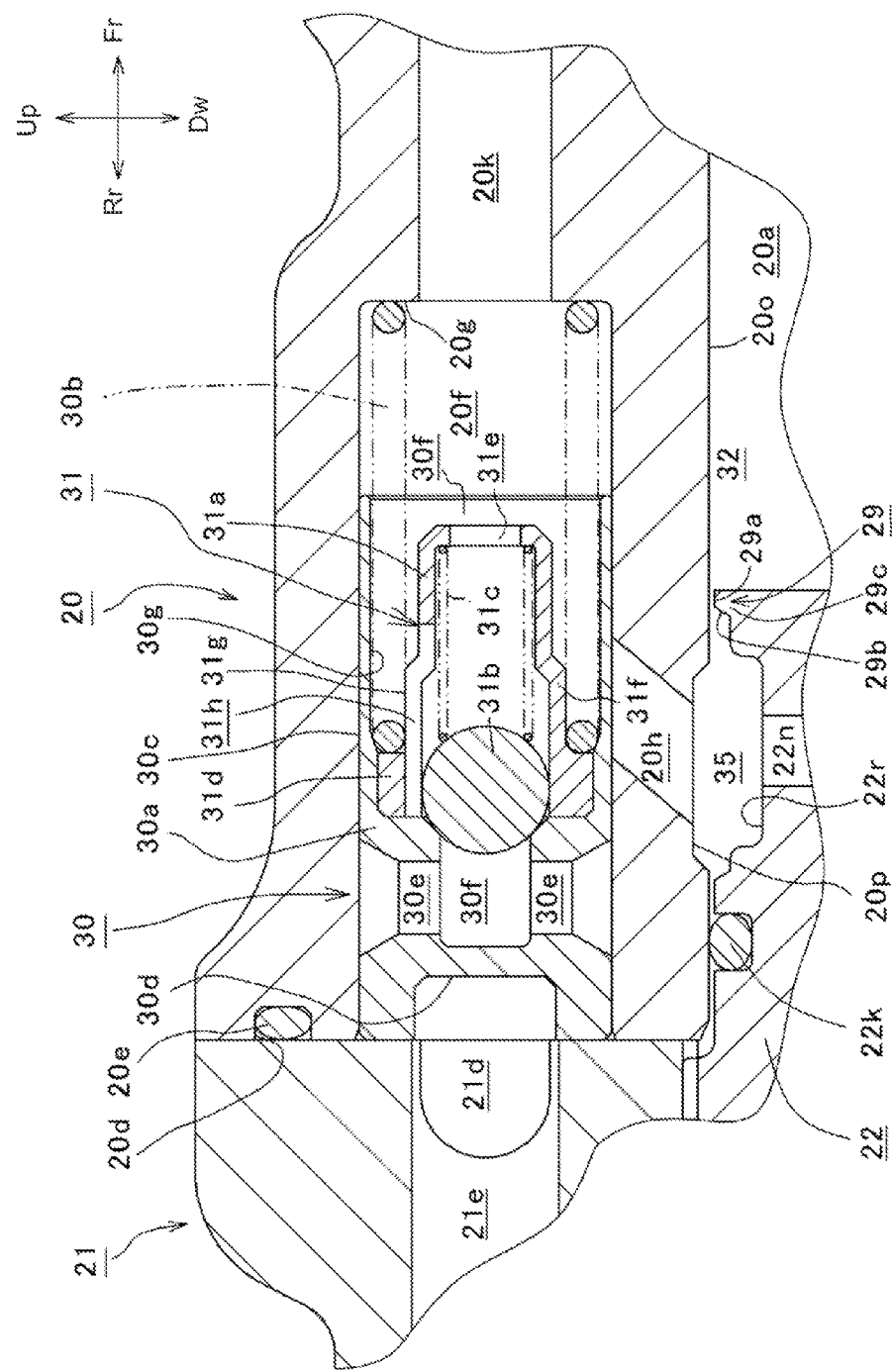
FIG. 9 is a longitudinal sectional view of a main part of the hydraulic tensioner, where an internal combustion engine is stopped, and a pressure maintenance valve and an air release valve are fitted into a pressure maintenance valve-accommodation hole of a tensioner body.
Figure 14:
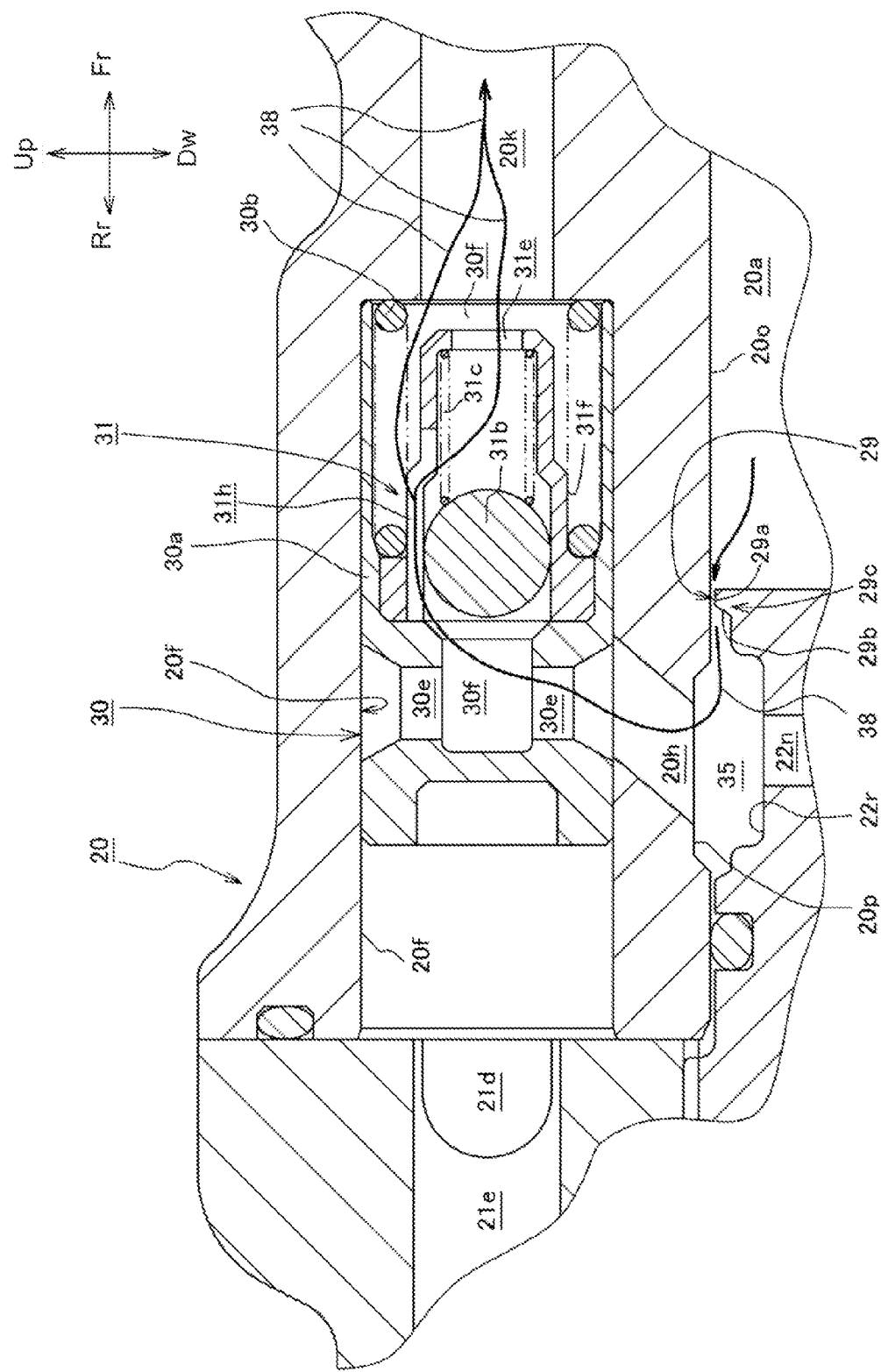
FIG. 14 is a longitudinal sectional view of a main part of the hydraulic tensioner, where in the state of FIG. 12, pressurized oil flows into a discharge oil passage through a gap between a tip end portion of an annular protrusion and a plunger accommodation hole.

As shown in FIGS. 9 and 14, the annular protrusion 29 is formed in the proximal end portion 22a of the valve holder 22 that faces the inner circumferential surface 20o of the plunger accommodation hole 20a. When the valve holder 22 is inserted into the plunger accommodation hole 20a, a gap having a predetermined dimension is formed between a tip end portion 29a of the annular protrusion 29 in the radial direction, and the inner circumferential surface 20o of the plunger accommodation hole 20a.

The annular protrusion 29 is provided with a rear inclined portion 29b on its rear side, and is formed so as to have, in a longitudinal section passing though the shaft axis of the valve holder 22, a trapezoidal cross section in which the dimension of the rear inclined portion 29b provided on the rear side of the annular protrusion 29 increases from the tip end portion 29a in the radial direction toward the shaft axis. In other words, the annular protrusion 29 is formed into a trapezoidal shape whose width in the axial direction increases toward the shaft center of the valve holder 22, from the tip end portion 29a of the annular protrusion 29 in the radial direction to a base portion 29c thereof, whereby the strength of the annular protrusion 29 is maintained. The tip end portion 29a of the annular protrusion 29 in the radial direction is formed into a cylindrical surface along the circumferential direction, the cylindrical surface being similar to a transverse section of the plunger accommodation hole 20a with respect to the axial direction. The gap between the tip end portion 29a of the annular protrusion 29 in the radial direction and the inner circumferential surface 20o of the plunger accommodation hole 20a functions as the so-called oil damper when the plunger 23 is pushed in, and can buffer the plunger 23 (see FIG. 12). Note that the axial length of the tip end portion 29a in the radial direction is designed according to the amount of damping necessary for the hydraulic tensioner 0.

As shown in FIG. 8, inside the valve holder 22, a through hole is provided along the axial direction of a center portion, and an annular groove 22m, a relief valve-accommodation hole 22e, a check valve-accommodation hole 22d, and a connection hole 22p are formed in this order from the proximal end portion 22a side of the through hole. In an upper portion of the relief valve-accommodation hole 22e, a relief valve port 22n is opened in the circumferential concave portion 22r, so as to face the connection port 20h formed in the tensioner body 20.

As shown in FIGS. 6 to 8, the cylindrical boss portion 22g of the valve holder 22 is inserted from a rear portion of the plunger accommodation hole 20a of the tensioner body 20, fitted to the plunger accommodation hole 20a through the O ring 22k that prevents oil leakage, and is sealed and fixed by the tensioner body 20 and the cap 21 attached to the rear end portion of the tensioner body 20. Hence, the valve holder 22 is fixed to the tensioner body 20 such that the gap between the tip end portion 29a of the annular protrusion 29 in the radial direction and the inner circumferential surface 20o of the plunger accommodation hole 20a is kept constant along the entire periphery of the annular protrusion 29, whereby a constant amount of oil can be fed therethrough when the plunger 23 is pushed in.

The cylindrical boss portion 22g is fixed to the tensioner body 20 as mentioned earlier, and thus functions to position the tip end portion 29a of the annular protrusion 29 in the radial direction with respect to the inner circumferential surface 20o of the plunger accommodation hole 20a. Moreover, since the cylindrical boss portion is provided in a different position in the axial direction from the annular protrusion 29 in the proximal end portion 22a, the dimension of the gap between the tip end portion 29a of the annular protrusion 29 in the radial direction and the inner circumferential surface 20o of the plunger accommodation hole 20a can be adjusted without bringing the tip end portion 29a of the annular protrusion 29 in the radial direction into contact with the inner circumferential surface 20o of the plunger accommodation hole 20a.

As shown in FIGS. 6 to 8, a check valve 25, which transmits oil fed from the tensioner oil feed passage 33 into the high hydraulic pressure chamber 32 in one direction, is configured of a cylindrical valve body 25a including a valve seat 25d whose rear end portion is formed into a conical shape, and a valve spring 25b. Four openings 25c are formed in an outer circumferential surface 25f of the valve body 25a. In addition, a relief valve 26, which opens when pressure inside the high hydraulic pressure chamber 32 is not less than a predetermined pressure and discharges oil inside the high hydraulic pressure chamber 32, is configured of a substantially cylindrical valve body 26a, and a relief valve spring 26c. A circumferential groove 26d into which a sealing ring 26e serving as a sealing member is fitted is formed in an outer circumferential surface 26o of the valve body 26a, a reduced diameter-tip end portion 26h having a small diameter is provided on the front end of the valve body 26a, and a valve hole 26k is provided in the reduced diameter-tip end portion 26h.

Note that the in the sealing ring 26e, in addition to the outer circumferential surface 26f which is formed so as to have a convex rectangular cross section, an inner circumferential surface 26g may also have a concave cross section that follows the shape of the outer circumferential surface 26f.

As shown in FIGS. 6 to 8, the valve spring 25b and the valve body 25a of the check valve 25 are sequentially inserted frontward in a movable manner into the check valve-accommodation hole 22d formed in the center portion of the valve holder 22 from a rear portion thereof, then the valve body 26a of the relief valve 26 having the sealing ring 26e fitted into the circumferential groove 26d is movably inserted into the relief valve-accommodation hole 22e formed in the proximal end portion 22a of the valve holder 22, and the valve seat 25d of the check valve 25 is fitted to the valve hole 26k provided in the reduced diameter-tip end portion 26h of the valve body 26a. At this time, a connection passage 26n is formed in a space between the reduced diameter-tip end portion 26h of the relief valve 26 and the relief valve-accommodation hole 22e of the valve holder 22.

Then, after the relief valve spring 26c is inserted into a valve chamber 26b of the valve body 26a of the relief valve 26, a cylindrical portion 27a of a relief valve seat 27 is inserted into a rear end opening of the valve body 26a, and a circlip 28 is fitted to the annular groove 22m of the valve holder 22, whereby the check valve 25 and the relief valve 26 are incorporated into the valve holder 22.

As shown in FIGS. 8 and 9, the pressure maintenance valve 30 for maintaining pressure inside the high hydraulic pressure chamber 32 is configured of a cylindrical piston valve body 30a and a piston valve body spring 30b for biasing the piston valve body 30a rearward. The pressure maintenance valve 30 includes therein, as air release passages, a radial passage 30e opened in a side face 30c of the piston valve body 30a, and an axial passage 30f connected thereto. The radial passage 30e is provided in a position where it does not connect with the later-mentioned connection port 20h provided in the tensioner body 20 and is closed by the pressure maintenance valve-accommodation hole 20f, when the pressure maintenance valve 30 is closed (see FIG. 6). Meanwhile, the axial passage 30f extends in the axial direction of the piston valve body 30a, opposite to a pressure receiving face 30d of the piston valve body 30a onto which pressurized oil is fed from the radial passage 30e. An air release valve 31, which releases air as well as prevents air from back flowing when the plunger 23 is moved frontward after release of air, is provided inside the axial passage 30f.

As shown in FIGS. 8 and 9, the pressure maintenance valve 30 is fitted into the pressure maintenance valve-accommodation hole 20f provided in the tensioner body 20 from the rear of the tensioner body 20, so as to be slidable in the front-rear direction, and is biased rearward by the later-mentioned piston valve body spring 30b, which is piston valve body-biasing means, inside the pressure maintenance valve-accommodation hole 20f.

As shown in FIGS. 8 and 9, the air release valve 31 is provided inside the piston valve body 30a of the pressure maintenance valve 30. The air release valve 31 is provided to release air, as well as to prevent air from back flowing when the plunger 23 is moved frontward after release of air. The air release valve 31 includes a ball valve body 31b, a ball valve spring 31c as ball valve biasing means for biasing the ball valve body 31b, and a retainer 31a in which the ball valve spring 31c is retained.

The retainer 31a is formed into a substantially cylindrical shape, and has an enlarged diameter portion 31f having an enlarged outer diameter formed on its rear side, which is the side that abuts on the piston valve body 30a. An opening 31e is provided in a front end face of the retainer 31a, and multiple outer circumference openings 31h are provided in an outer circumferential surface 31g of the enlarged diameter portion 31f. The ball valve body 31b and the ball valve spring 31c are accommodated inside the enlarged diameter portion 31f of the retainer 31a.

A base portion 31d having an even larger diameter is provided in a part of the enlarged diameter portion 31f of the retainer 31a where it abuts on the piston valve body 30a, and the retainer 31a is pressed in and fixed inside the axial passage 30f of the pressure maintenance valve 30. Additionally, the piston valve body spring 30b of the pressure maintenance valve 30 is interposed between a front end face of the base portion 31d and a spring receiving-end face 20g, which is a front end face of the pressure maintenance valve-accommodation hole 20f provided in the tensioner body 20.

The piston valve body spring 30b has its rear end portion held by the outer circumferential surface 31g of the enlarged diameter portion 31f and an inner circumferential surface 30g of the piston valve body 30a. This can suppress movement of the piston valve body spring 30b in the radial direction when it expands and contracts. Since the piston valve body spring 30b is arranged in this manner, at least a part of the retainer 31a and the ball valve spring 31c are included within an area where they are overlapped with the piston valve body spring 30b in the axial direction, and thus the length of the pressure maintenance valve 30 in the axial direction can be suppressed.

As shown in FIGS. 6 to 9, the pressure maintenance valve-accommodation hole 20f is provided in an upper portion inside the tensioner body 20, and when installed in the internal combustion engine 3, will be arranged higher than the plunger 23 (see FIG. 1). Hence, air having entered the high hydraulic pressure chamber 32 can be collected inside the pressure maintenance valve-accommodation hole 20f, and be released efficiently by the air release valve 31 provided inside the pressure maintenance valve-accommodation hole 20f.

Note that although the plunger accommodation hole 20a of the tensioner body 20 and the outer circumferential surface 22c of the valve holder 22, as well as the outer circumferential surfaces of the valve bodies 25a, 26a, 30a, 31b moving along the central axis of the plunger accommodation hole 20a are formed into a cylindrical surface, they may otherwise be formed into an elliptic cylindrical surface or a polygonal cylindrical surface.

As shown in FIGS. 3 to 5, the cap 21 attached to the rear end portion of the tensioner body 20 has the aforementioned paired tensioner fixing bolt insertion holes 21c, as well as a cap fixing bolt insertion hole 21k as shown in FIG. 7. Additionally, a circular concave end portion 21n is formed in a front end face 21a of the cap 21, as in FIGS. 4 and 7, and the end portion 21n connects to the rear end of the oil feed passage 20m when the cap 21 is attached to tensioner body 20. Further, as shown in FIGS. 4 and 6, an extended feed passage 21e is formed for a predetermined length toward the rear from the front end face 21a of the cap 21. The extended feed passage 21e is provided in such a manner as to be positioned behind and in substantially coaxial alignment with the pressure maintenance valve-accommodation hole 20f and be connectable therewith, when the cap 21 is attached to the tensioner body 20. The extended feed passage 21e is provided in the highest position among the passages for feeding oil to the high hydraulic pressure chamber 32 of the hydraulic tensioner 0, and can accumulate air mixed in the fed oil. In addition, as shown in FIG. 4, a horizontal passage 21d is formed obliquely upward from the end portion 21n so as to link the end portion 21n and the extended feed passage 21e.

As shown in FIGS. 4 to 6, a holder accommodation hole 21h, which is positioned on the front side of the cap 21 in the axial direction and into which the proximal end portion 22a of the valve holder 22 is screwed, is formed in the substantial center of the front end face 21a of the cap 21. An oil reservoir 21g having a smaller inner diameter than that of the holder accommodation hole 21h is formed behind the holder accommodation hole 21h.

A connection passage 21f that extends obliquely upward in the rear direction from the oil reservoir 21g and connects with a rear portion of the extended feed passage 21e is formed in the cap 21. Moreover, as shown in FIGS. 4 and 5, an air release hole 21m for releasing air accumulated in the oil reservoir 21g is formed, so as to extend obliquely upward in the front direction from the oil reservoir 21g and connect to the tensioner fixing bolt insertion hole 21c. The air release hole 21m is formed such that the opening on the oil reservoir 21g side is smaller than that on the tensioner fixing bolt insertion hole 21c side.

Since the cap 21 includes passages through which oil flows as mentioned earlier, oil pumped from the oil pump 41 is fed to the oil reservoir 21g after sequentially passing through the tensioner oil feed passage 33, the oil feed passage 20m, the end portion 21n, the horizontal passage 21d, the extended feed passage 21e, and the connection passage 21f.

And as shown in FIG. 7, the valve holder 22 is inserted from the rear end of the plunger accommodation hole 20a, the front end face 21a of the cap 21 and the rear end face 20c of the tensioner body 20 are brought into contact with each other, and a connecting bolt 37 inserted into the cap fixing bolt insertion hole 21k is screwed into a female screw hole 20n formed in the tensioner body 20, whereby the valve holder 22 is sealed and fixed by the cap 21 and the tensioner body 20.

Since the hydraulic tensioner 0 is configured in the aforementioned manner, movable component members of the hydraulic tensioner 0 from the plunger 23 to the air release valve 31 are stopped in the states shown in FIGS. 6 and 7, when the internal combustion engine 3 is in a stopped state.

When the internal combustion engine 3 is started and the crankshaft 9 rotates in the clockwise direction in FIG. 1, the oil pump 41 goes into operation, so that oil inside an oil pan 17 integrally coupled with a lower portion of the crankcase 4 passes through an oil strainer 40, is fed to an oil filter 43 through a filter oil passage 42 by the oil pump 41, clean oil is fed to a shaft bearing portion of the crankshaft 9 through a crankshaft oil feed passage 44 after foreign matter is removed from the oil by the oil filer 43, and then is fed to the movable parts of the internal combustion engine 3, as well as is fed to the tensioner oil feed passage 33 provided in the lifter attachment portion 6a of the cylinder head 6 through an oil feed passage 45, as shown in FIGS. 1 and 7.

Figure 10:
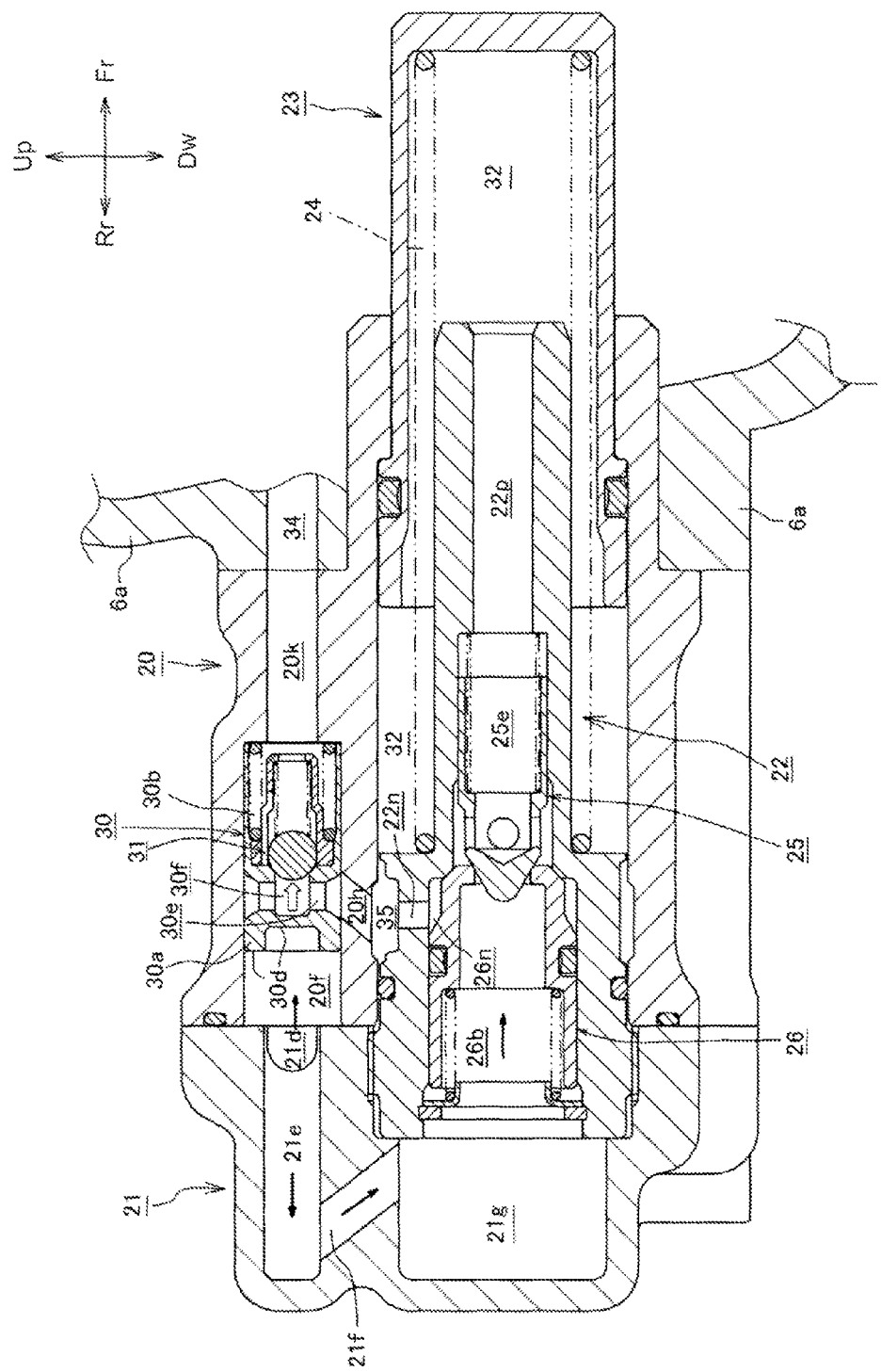
FIG. 10 is a longitudinal sectional view of the hydraulic tensioner, where the internal combustion engine is started and the pressure maintenance valve is opened.

As shown in FIG. 7, pressurized oil fed to the tensioner oil feed passage 33 passes through the oil feed passage 20m of the tensioner body 20, as well as the end portion 21n and the horizontal passage 21d of the cap 21, and thereafter flows into the pressure maintenance valve-accommodation hole 20f in front of the horizontal passage 21d and into the extended feed passage 21e behind the horizontal passage, as shown in FIG. 10.

Oil flowing into the extended feed passage 21e flows into the valve chamber 26b of the relief valve 26 through the connection passage 21f and the oil reservoir 21g.

Meanwhile, pressurized oil flowing into the pressure maintenance valve-accommodation hole 20f pushes the pressure receiving face 30d of the pressure maintenance valve 30, so that the piston valve body 30a of the pressure maintenance valve 30 moves frontward against the spring force of the piston valve body spring 30b to open the pressure maintenance valve 30. As a result, insides of the air release passages 30e, 30f of the pressure maintenance valve 30 are connected with the connection port 20h of the tensioner body 20, the connection passage 35, the relief valve port 22n of the valve holder 22, and the connection passage 26n in the space between the relief valve 26 and the relief valve-accommodation hole 22e.

Figure 11:
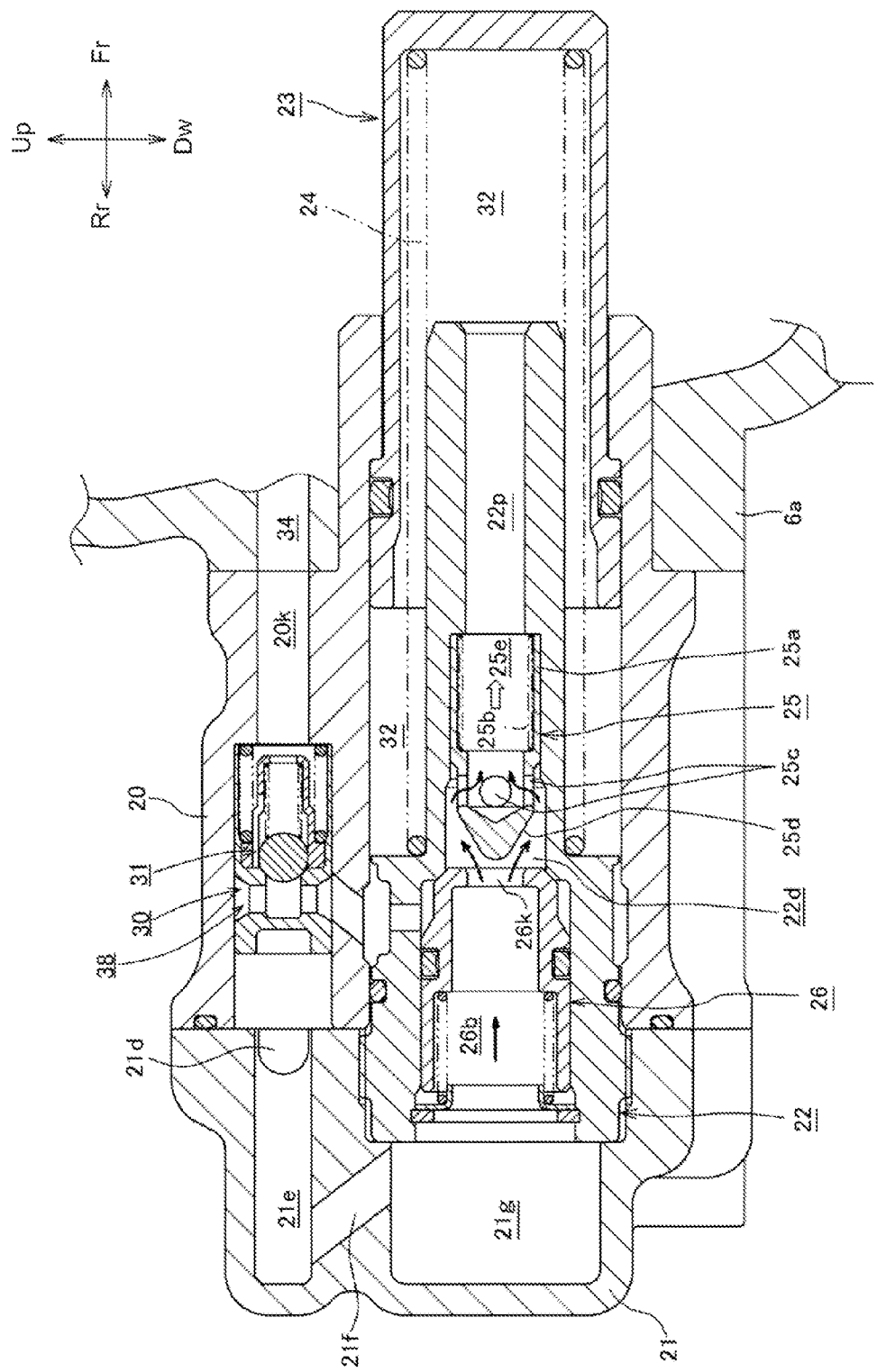
FIG. 11 is a longitudinal sectional view of the hydraulic tensioner, where a check valve is opened after startup of the internal combustion engine.

As shown in FIG. 11, when the speed of the internal combustion engine 3 slightly increases after startup, and hydraulic pressure inside the valve chamber 26b of the relief valve 26 exceeds a preset pressure for opening the check valve 25, the hydraulic pressure causes the valve body 25a of the check valve 25 to move frontward, whereby the valve seat 25d of the check valve 25 fitted to the valve hole 26k of the relief valve 26 is detached to open the check valve 25, pressurized oil inside the valve chamber 26b of the relief valve 26 flows into a valve chamber 25e through the valve hole 26k, the check valve-accommodation hole 22d of the valve holder 22, and the openings 25c of the check valve 25, then flows from the valve chamber 25e into the high hydraulic pressure chamber 32 formed of the plunger accommodation hole 20a of the tensioner body 20, the spring holding body 22f of the valve holder 22, and the plunger 23, through the connection hole 22p of the valve holder 22, and when the tension applied to the endless timing chain 13 is reduced, pressurized oil inside the high hydraulic pressure chamber 32 and biasing force of the plunger spring 24 causes the plunger 23 to protrude frontward, whereby flapping of the endless timing chain 13 is suppressed.

Figure 12:
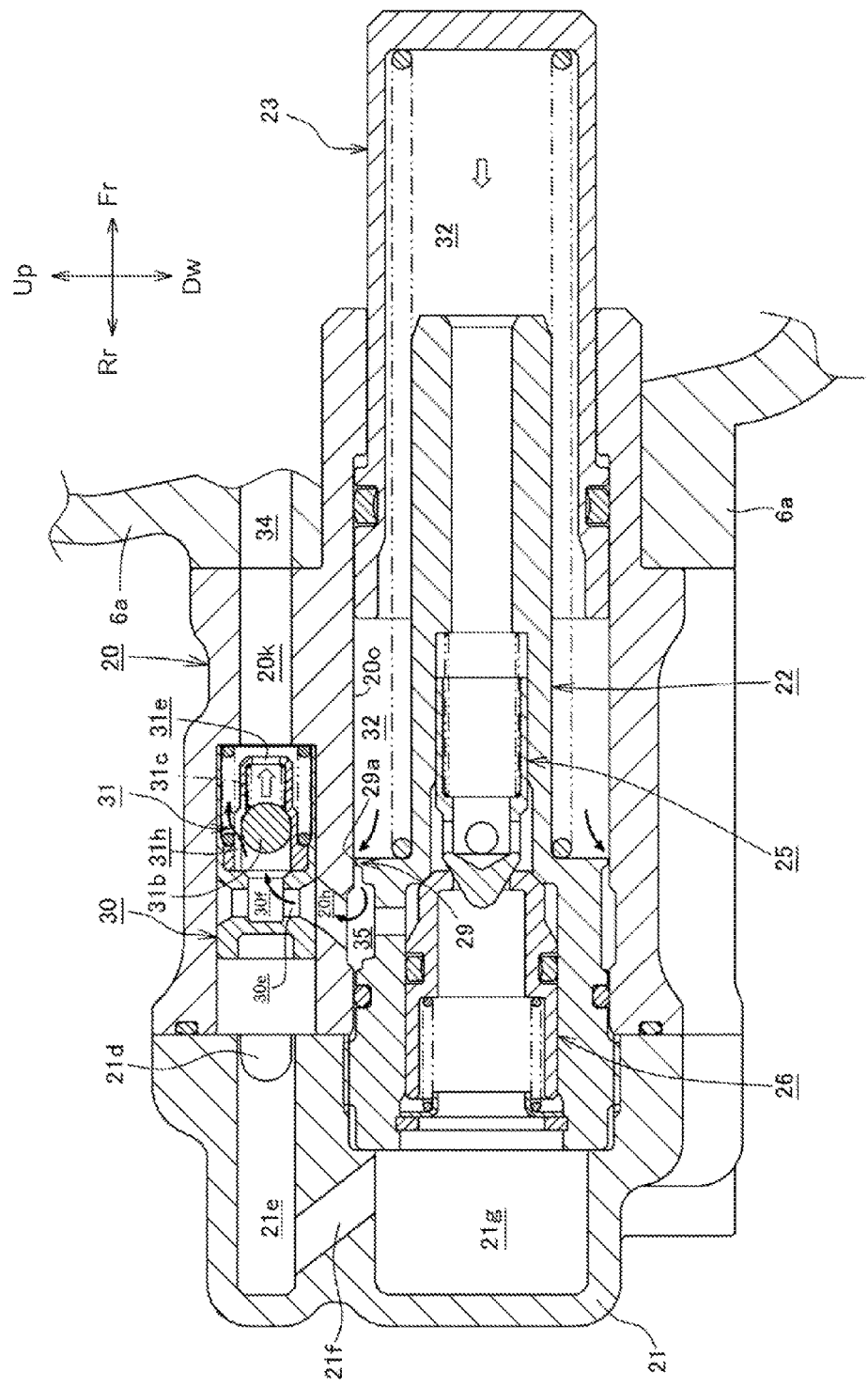
FIG. 12 is a longitudinal sectional view of the hydraulic tensioner, where during operation of the internal combustion engine, hydraulic pressure inside the high hydraulic pressure chamber increases, and pressurized oil flows into the pressure maintenance valve to open the air release valve.

As shown in FIGS. 12 and 14, when the internal combustion engine 3 returns to normal operation and the endless timing chain 13 regains its normal tension, the tension pushes in the plunger 23 slightly, hydraulic pressure inside the high hydraulic pressure chamber 32 slightly increases, pressurized oil inside the high hydraulic pressure chamber 32 flows into the connection passage 35 through the gap between the tip end portion 29a of the annular protrusion 29 in the radial direction and the inner circumferential surface 20o of the plunger accommodation hole 20a, and further flows into the radial passage 30e as well as the axial passage 30f of the pressure maintenance valve 30 through the connection port 20h of the tensioner body 20.

When pressurized oil passes through, the gap between the tip end portion 29a of the annular protrusion 29 in the radial direction and the inner circumferential surface 20o of the plunger accommodation hole 20a functions as an oil damper, so that the plunger 23 can be buffered to more easily follow the endless timing chain 13.

And as shown in FIGS. 12 and 14, when pressure of pressurized oil flowing into the axial passage 30f exceeds a preset pressure for opening the air release valve 31 provided in an intermediate portion of the axial passage 30f, the ball valve spring 31c biasing the ball valve body 31b is pushed frontward, the ball valve body 31b moves frontward to open the air release valve 31, pressurized oil flowing into the axial passage 30f passes through the opening 31e and the outer circumference openings 31h opened in the retainer 31a of the air release valve 31, flows into the discharge passage 34 provided in the lifter attachment portion 6a through the discharge hole 20k of the tensioner body 20, and is returned into the oil pan 17. At this time, air mixed in the oil is also discharged with the oil.

Thus, oil that leaks through the gap between the tip end portion 29a of the annular protrusion 29 in the radial direction and the inner circumferential surface 20o of the plunger accommodation hole 20a from the high hydraulic pressure chamber 32 is discharged to the discharge passage 34 from the discharge oil passage 38 consisting of the connection passage 35, the connection port 20h, the radial passage 30e, the axial passage 30f, and the discharge hole 20k.

Figure 13:
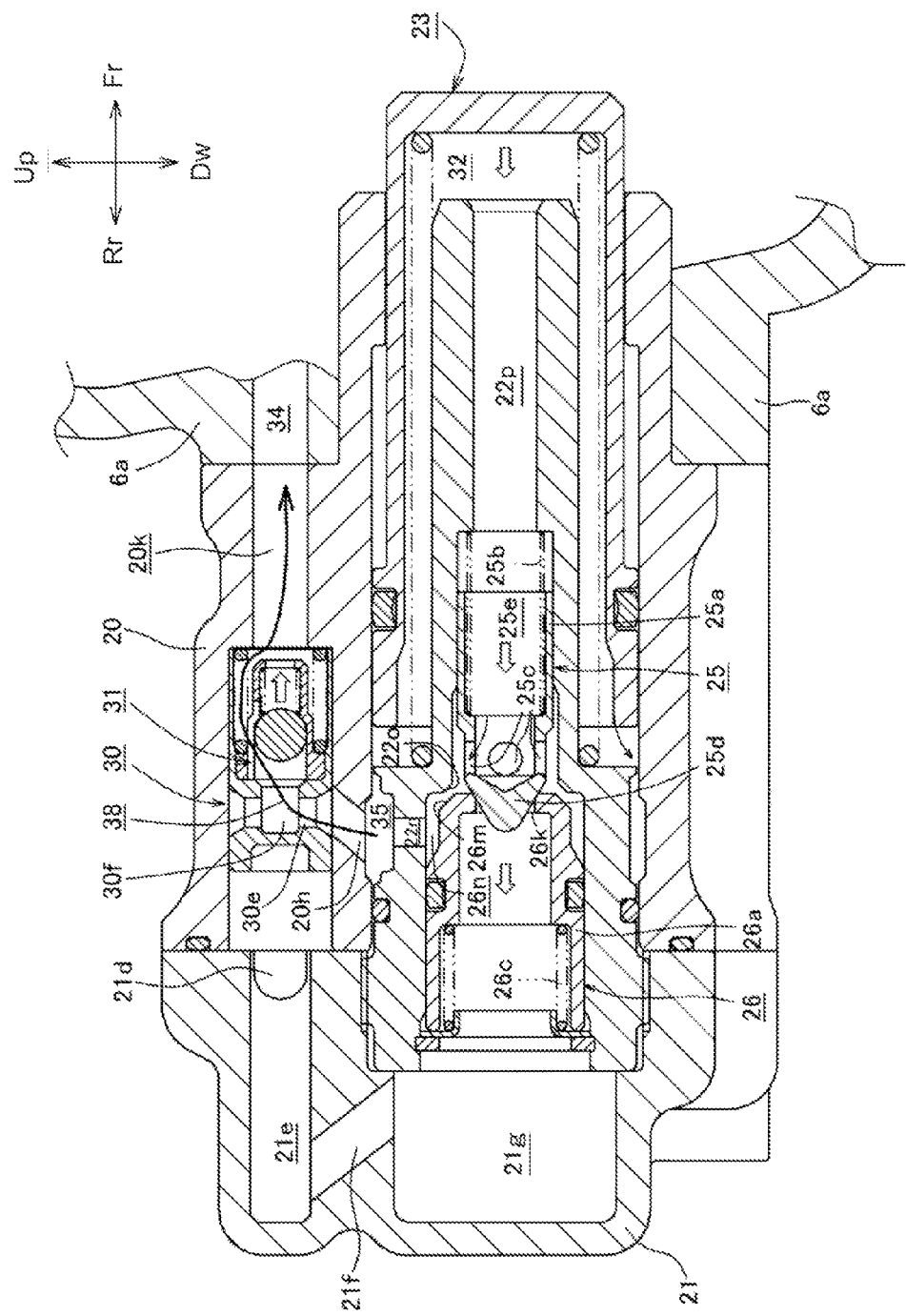
FIG. 13 is a longitudinal sectional view of the hydraulic tensioner, where in the state of FIG. 12, hydraulic pressure inside the high hydraulic pressure chamber further increases to open a relief valve.

Furthermore, as shown in FIG. 13, when the plunger 23 is pushed rearward by being applied a stronger force to be pushed into the high hydraulic pressure chamber 32, the valve body 25a of the check valve 25 is moved rearward by pressurized oil inside the high hydraulic pressure chamber 32, and the valve seat 25d of the check valve 25 is pushed into the valve hole 26k of the relief valve 26. Then, when pressure of pressurized oil inside the high hydraulic pressure chamber 32 exceeds a preset pressure for opening the relief valve 26, the relief valve spring 26c biasing the valve body 26a of the relief valve 26 is pushed rearward, the valve body 26a of the relief valve 26 moves rearward so that a relief valve abutting face 22o of the valve holder 22 and an abutting face 26m of the relief valve 26 are separated to open the relief valve 26, high-pressure oil inside the high hydraulic pressure chamber 32 sequentially passes through the connection hole 22p of the valve holder 22, the valve chamber 25e and the openings 25c of the check valve 25, the gap between the relief valve abutting face 22o of the valve holder 22 and the abutting face 26m of the relief valve 26, the connection passage 26n, and the relief valve port 22n of the valve holder 22, thereafter passes through the discharge oil passage 38 consisting of the connection passage 35, the connection port 20h, the radial passage 30e, the axial passage 30f, and the discharge hole 20k, and is allowed to flow into the discharge passage 34, whereby excessive tension of the endless timing chain 13 can be eased promptly.

After discharging pressurized oil to the discharge passage 34 by the above operation, the plunger 23 is moved frontward by biasing force of the plunger spring 24, so that pressure inside the high hydraulic pressure chamber 32 becomes lower than that on the oil feeding side. This causes the check valve 25 to open, and oil is fed from the oil reservoir 21g. Since the hydraulic tensioner 0 of the embodiment includes the oil reservoir 21g, oil can be fed promptly to the high hydraulic pressure chamber 32 immediately after oil discharge (see FIG. 6). Additionally, since the oil reservoir 21g is provided, oil from which mixed air is released into the extended feed passage 21e can be reserved even when the internal combustion engine 3 is stopped, so that the hydraulic tensioner 0 can function excellently even immediately after startup of the internal combustion engine 3.

In addition, as shown in FIG. 5, air accumulated inside the oil reservoir 21g is released to the tensioner fixing bolt insertion hole 21c, through the air release hole 21m formed in an upper portion of the oil reservoir 21g. Since the air release hole 21m is formed such that the opening on the oil reservoir 21g side is smaller than that on the tensioner fixing bolt insertion hole 21c side as mentioned earlier, it serves as an orifice, and prevents oil from flowing out excessively from the oil reservoir 21g.

Then, air released to the tensioner fixing bolt insertion hole 21c passes through gaps between the tensioner fixing bolt 36 and the tensioner fixing bolt insertion holes 21c, 20b, reaches the abutting face 20q of the tensioner body 20, and is released from the discharge hole 20k through the air release passage 20r, which is formed in the abutting face 20q as shown in FIG. 2.

When the internal combustion engine 3 is stopped, the oil pump 41 also stops feeding oil and pressure of fed oil decreases. When pressure of fed oil becomes not higher than a preset pressure for opening the pressure maintenance valve 30, the pressure maintenance valve 30 is closed by biasing force of its piston valve body spring 30b (see FIG. 6). At this time, the radial passage 30e of the pressure maintenance valve 30 is closed by the pressure maintenance valve-accommodation hole 20f while the connection port 20h is closed by the side face 30c of the piston valve body 30a of the pressure maintenance valve 30, and thus leakage of pressurized oil inside the high hydraulic pressure chamber 32 can be suppressed (see FIG. 9).

The embodiment described above has the following effects:

(1) Since air in hydraulic oil inside the high hydraulic pressure chamber 32, which is configured between the plunger accommodation hole 20a of the tensioner body 20 and the plunger 23 slidably accommodated in the plunger accommodation hole 20a, is released through the air release passages 30e, 30f integrated with the pressure maintenance valve 30, not only can parts related to the pressure maintenance valve 30 be eliminated, but also the hydraulic pathway can be simplified, whereby reduction in weight of the hydraulic tensioner 0 and a significant cost reduction can be achieved.

(2) Since the air release passages 30e, 30f formed in the pressure maintenance valve 30 are configured of the axial passage 30f and the radial passage 30e opened in the side face of the piston valve body 30a of the pressure maintenance valve 30, and the air release valve 31 is provided so as to be movable in the axial passage 30f along the direction in which the valve operates, the outer diameter of the piston valve body 30a of the pressure maintenance valve 30 is smaller than a case where the valve operates in the radial direction, and thus the hydraulic tensioner 0 can be reduced in size.

(3) By arranging at least a part of the air release valve spring 31c and the retainer 31a inside the piston valve body spring 30b within an area where they are overlapped with the piston valve body spring in the axial direction, and incorporating the air release valve 31 into the pressure maintenance valve 30, the length of the pressure maintenance valve 30 in the axial direction can be suppressed, and the hydraulic tensioner 0 can be even more reduced in size.

(4) By forming the enlarged diameter portion 31f by enlarging the diameter of the retainer 31a on the piston valve body side, and using the outer circumferential surface 31g thereof and the inner circumferential surface 30g of the piston valve body 30a to hold the piston valve body spring 30b, radial movement of the piston valve body spring 30b can be restricted, and opening and closing accuracy of the pressure maintenance valve 30 can be improved.

(5) Since the air release passages 30e, 30f are closed when the radial passage 30e of the pressure maintenance valve 30 is disconnected from the connection port 20h of the tensioner body 20 by a rearward movement of the piston valve body 30a of the pressure maintenance valve 30, leakage of hydraulic oil from the air release valve 31 is suppressed, and hydraulic oil can be retained more securely.

(6) By installing the pressure maintenance valve 30 in a higher position than the plunger 23 in the tensioner body 20, leakage air accumulated inside the high hydraulic pressure chamber 32 can be collected and be released more efficiently.

(7) By connecting the oil feed passage 20m provided in the tensioner body 20 to the higher-positioned pressure maintenance valve 30 through the horizontal passage 21d of the cap 21, air mixed in fed oil is more easily accumulated in the extended feed passage 21e, so that air flow into the high hydraulic pressure chamber 32 can be inhibited.

(8) Since the extended feed passage 21e is formed in an intermediate part of the oil feed pathway to the oil reservoir 21g in such a manner as to extend in the axial direction above the oil reservoir, air mixed in fed oil can be retained inside the extended feed passage 21e, and be inhibited from entering the oil reservoir 21g.

Although the embodiment has been described with reference to the drawings, the embodiment is not limited to the above description, and changes can be made without departing from the gist of the present invention.

DESCRIPTION OF REFERENCE NUMERALS

0 . . . hydraulic tensioner device, 1 . . . body frame, 2 . . . hanger, 3 . . . internal combustion engine, 4 . . . crankcase, 5 . . . cylinder block, 6 . . . cylinder head, 6a . . . lifter attachment portion, 6b . . . female screw hole, 7 . . . head cover, 8 . . . boss, 9 . . . crankshaft, 10 . . . drive sprocket, 11 . . . camshaft, 12 . . . driven sprocket, 13 . . . endless timing chain, 14 . . . chain guide, 15 . . . tensioner slipper, 16 . . . driving force-transmission mechanism, 17 . . . oil pan, 20 . . . tensioner body, 20a . . . plunger accommodation hole, 20b . . . tensioner fixing bolt insertion hole, 20c . . . rear end face, 20d . . . O ring fitting groove, 20e . . . O ring, 20f . . . pressure maintenance valve-accommodation hole, 20g . . . spring receiving-end face, 20h . . . connection port, 20k . . . discharge hole, 20m . . . oil feed passage, 20n . . . female screw hole, 20o . . . inner circumferential surface, 20p . . . inner groove, 20q . . . abutting face, 20r . . . air release passage, 21 . . . cap, 21a . . . front end face, 21b . . . rear end face, 21c . . . tensioner fixing bolt insertion hole, 21d . . . horizontal passage, 21e . . . extended feed passage, 21f . . . connection passage, 21g . . . oil reservoir, 21h . . . holder accommodation hole, 21k . . . cap fixing bolt insertion hole, 21m . . . air release hole, 22 . . . valve holder, 22a . . . proximal end portion, 22b . . . front end face of stepped portion, 22c . . . outer circumferential surface, 22d . . . check valve accommodation hole, 22e . . . relief valve accommodation hole, 22f . . . spring holding body, 22g . . . cylindrical boss portion, 22h . . . circumferential groove, 22k . . . O ring, 22m . . . annular groove, 22n . . . relief valve port, 22o . . . relief valve abutting face, 22p . . . connection hole, 22q . . . rear end face, 22r . . . circumferential concave portion, 23 . . . plunger, 23a . . . tip end portion, 23b . . . inner face, 23c . . . circumferential groove, 23d . . . sealing ring, 23e . . . outer circumferential surface, 23f . . . inner circumferential surface, 24 . . . plunger spring, 25 . . . check valve, 25a . . . valve body, 25b . . . valve spring, 25c . . . opening, 25d . . . valve seat, 25e . . . valve chamber, 25f . . . outer circumferential surface, 26 . . . relief valve, 26a . . . valve body, 26b . . . valve chamber, 26c . . . relief valve spring, 26d . . . circumferential grove, 26e . . . sealing ring, 26f . . . outer circumferential surface, 26g . . . inner circumferential surface, 26h . . . reduced diameter-tip end portion, 26k . . . valve hole, 26m . . . abutting face, 26n . . . connection passage, 26o . . . outer circumferential surface, 27 . . . relief valve seat, 27a . . . cylindrical portion, 28 . . . circlip, 29 . . . annular protrusion, 29a . . . tip end portion in radial direction, 29b . . . rear inclined portion, 30 . . . pressure maintenance valve, 30a . . . piston valve body, 30b . . . piston valve body spring, 30c . . . side face, 30d . . . pressure receiving face, 30e . . . radial passage, 30f . . . axial passage, 30g . . . inner circumferential surface, 31 . . . air release valve, 31a . . . retainer, 31b . . . ball valve body, 31c . . . air release valve spring, 31d . . . base portion, 31e . . . opening, 31f . . . enlarged diameter portion, 31g . . . outer circumferential surface, 31h . . . outer circumference opening, 32 . . . high hydraulic pressure chamber, 33 . . . tensioner oil feed passage, 34 . . . discharge passage, 35 . . . connecting concave portion, 36 . . . tensioner fixing bolt, 37 . . . connecting bolt, 38 . . . discharge oil passage, 40 . . . oil strainer, 41 . . . oil pump, 42 . . . filter oil passage, 43 . . . oil filter, 44 . . . crankshaft oil feed passage, 45 . . . oil feed passage.

What is claimed is:

1. A hydraulic tensioner device used in a driving force-transmission mechanism for internal combustion engine including an endless transmission belt that transmits power while being wound around a driving member and a driven member, comprising:
a plunger biased toward said endless transmission belt side to tighten looseness of the endless transmission belt; and
a tensioner body in which a plunger accommodation hole for slidably accommodating the plunger is formed,
a high hydraulic pressure chamber being configured by reserving oil fed through a check valve between said plunger and said plunger accommodation hole to attenuate reactive force acting on said plunger, wherein:
said tensioner body includes, in a discharge oil passage for discharging oil leaked from said high hydraulic pressure chamber, a pressure maintenance valve for opening and closing the discharge oil passage;
an air release passage is formed inside said pressure maintenance valve; and
an air release valve for releasing air and preventing air from back flowing is provided in the air release passage.

2. The hydraulic tensioner device according to claim 1, wherein:
said pressure maintenance valve is configured of a piston valve body;
the piston valve body is slidably accommodated in a pressure maintenance valve-accommodation hole formed in said tensioner body;
said air release passage is configured of a radial passage opened in a side face of said piston valve body and extending radially, and an axial passage extending opposite to a pressure receiving face of said piston valve body onto which pressurized oil is fed from the radial passage; and
said air release valve is provided inside said axial passage along a direction in which said pressure maintenance valve operates.

3. The hydraulic tensioner device according to claim 2, wherein:
said air release valve includes a ball valve body, ball valve biasing device biasing the ball valve body, and a retainer in which the ball valve biasing device is retained; and
at least a part of the retainer and said ball valve biasing device are included within an area where they are overlapped with a piston valve body-biasing device in the axial direction.

4. The hydraulic tensioner device according to claim 3, wherein:
an enlarged diameter portion having an enlarged outer diameter on a side abutting said piston valve body is formed in said retainer;
said ball valve body is accommodated inside the enlarged diameter portion; and
an end portion of said piston valve body-biasing device is held by an outer circumferential surface of the enlarged diameter portion and an inner circumferential surface of said piston valve body.

5. The hydraulic tensioner device according to claim 2, wherein:
said radial passage is provided in a position where it is closed by said pressure maintenance valve-accommodation hole when said pressure maintenance valve is closed.

6. The hydraulic tensioner device according to claim 1, wherein:
when said pressure maintenance valve is installed in an internal combustion engine of said hydraulic tensioner device, it is arranged higher than said plunger.

7. The hydraulic tensioner device according to claim 6, wherein:
an oil feed passage is formed lower than said pressure maintenance valve in said tensioner body; and
the oil feed passage is connected to said pressure maintenance valve positioned higher than said oil feed passage by a horizontal passage provided in a cap of said hydraulic tensioner device.

8. The hydraulic tensioner device according to claim 7, wherein:

an oil reservoir is provided between said oil feed passage and said high hydraulic pressure chamber;

an extended feed passage is formed above the oil reservoir, in the axial direction of said pressure maintenance valve; and said oil feed passage is connected to said oil reservoir through said extended feed passage.

9. The hydraulic tensioner device according to claim 3, wherein:

said radial passage is provided in a position where it is closed by said pressure maintenance valve-accommodation hole when said pressure maintenance valve is closed.

10. The hydraulic tensioner device according to claim 4, wherein:

said radial passage is provided in a position where it is closed by said pressure maintenance valve-accommodation hole when said pressure maintenance valve is closed.

11. The hydraulic tensioner device according to claim 2, wherein:

when said pressure maintenance valve is installed in an internal combustion engine of said hydraulic tensioner device, it is arranged higher than said plunger.

12. The hydraulic tensioner device according to claim 11, wherein:

an oil feed passage is formed lower than said pressure maintenance valve in said tensioner body; and the oil feed passage is connected to said pressure maintenance valve positioned higher than said oil feed passage by a horizontal passage provided in a cap of said hydraulic tensioner device.

13. The hydraulic tensioner device according to claim 12, wherein:

an oil reservoir is provided between said oil feed passage and said high hydraulic pressure chamber;

an extended feed passage is formed above the oil reservoir, in the axial direction of said pressure maintenance valve; and said oil feed passage is connected to said oil reservoir through said extended feed passage.

14. The hydraulic tensioner device according to claim 3, wherein:

when said pressure maintenance valve is installed in an internal combustion engine of said hydraulic tensioner device, it is arranged higher than said plunger.

15. The hydraulic tensioner device according to claim 14, wherein:

an oil feed passage is formed lower than said pressure maintenance valve in said tensioner body; and the oil feed passage is connected to said pressure maintenance valve positioned higher than said oil feed passage by a horizontal passage provided in a cap of said hydraulic tensioner device.

16. The hydraulic tensioner device according to claim 15, wherein:

an oil reservoir is provided between said oil feed passage and said high hydraulic pressure chamber;

an extended feed passage is formed above the oil reservoir, in the axial direction of said pressure maintenance valve; and said oil feed passage is connected to said oil reservoir through said extended feed passage.

17. The hydraulic tensioner device according to claim 4, wherein:

when said pressure maintenance valve is installed in an internal combustion engine of said hydraulic tensioner device, it is arranged higher than said plunger.

18. The hydraulic tensioner device according to claim 17, wherein:

an oil feed passage is formed lower than said pressure maintenance valve in said tensioner body; and the oil feed passage is connected to said pressure maintenance valve positioned higher than said oil feed passage by a horizontal passage provided in a cap of said hydraulic tensioner device.

19. The hydraulic tensioner device according to claim 18, wherein:

an oil reservoir is provided between said oil feed passage and said high hydraulic pressure chamber;

an extended feed passage is formed above the oil reservoir, in the axial direction of said pressure maintenance valve; and said oil feed passage is connected to said oil reservoir through said extended feed passage.

20. The hydraulic tensioner device according to claim 5, wherein:

when said pressure maintenance valve is installed in an internal combustion engine of said hydraulic tensioner device, it is arranged higher than said plunger.

* * * * *